(12) United States Patent
Mecca

(10) Patent No.: US 12,450,452 B2
(45) Date of Patent: *Oct. 21, 2025

(54) RADIO FREQUENCY IDENTIFICATION-ENABLED TECHNOLOGY, PRODUCTS AND METHODS FOR USE

(71) Applicant: Joshua Mecca, Houston, TX (US)

(72) Inventor: Joshua Mecca, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/900,546

(22) Filed: Sep. 27, 2024

(65) Prior Publication Data
US 2025/0094745 A1 Mar. 20, 2025

Related U.S. Application Data

(63) Continuation of application No. 17/754,618, filed on Apr. 7, 2022, now Pat. No. 12,136,014.

(51) Int. Cl.
*G06K 7/10* (2006.01)
*G06K 19/077* (2006.01)

(52) U.S. Cl.
CPC ... *G06K 7/10366* (2013.01); *G06K 19/07773* (2013.01)

(58) Field of Classification Search
CPC ......... G06K 7/10366; G06K 19/07773; G06K 7/10356; H01Q 21/065
See application file for complete search history.

(56) References Cited

U.S. PATENT DOCUMENTS

| | | | |
|---|---|---|---|
| 9,489,813 B1 * | 11/2016 | Beigel | G08B 13/2417 |
| 12,136,014 B2 * | 11/2024 | Mecca | G06K 19/07773 |
| 2018/0115068 A1 * | 4/2018 | Sazegar | H01Q 5/48 |

* cited by examiner

*Primary Examiner* — Sonji N Johnson
(74) *Attorney, Agent, or Firm* — Kearney, McWilliams & Davis, PLLC; William Yarbrough

(57) ABSTRACT

The present invention relates to technological improvements, use of these improvements and data analysis to provide for improved surgical procedure efficiency, efficacy, and safety. Specifically, improved radio frequency identification (RFID) enabled technology is utilized to discover and rectify significant inefficiencies, safety concerns and risks involved with surgical procedures through improved surgical implement tracking, both temporally and spatially, and data analytics for gathering, tracking and analyzing of instrument use singly and in combination.

1 Claim, 10 Drawing Sheets

FIG. 8

The RF Multiplexor was created to fire individual elements, between two to four elements at a time, while also being able to correctly fire each element based on the sequence received from the NUC. This is done through the RFID reader and RF Splitters, connecting the eight ports from the Reader and to the RF MUX. As the figure shows, there are a total of 61 SMA connections on the multiplexor. 28 eight of the SMA connections correspond to the A, B, C, and D inputs designated IN A, IN B, IN C, IN D. This means there are seven input connections for A, B, C, and D.

There 32 SMA connections correspond to the A, B, C, and D outputs. They are designated OUT A, OUT B, OUT C, and OUT D. This means there are eight output connections for A, B, C, and D, The eight outputs correspond to the eight A elements, with one A element in each of the eight PAEs.

The eight outputs correspond to the eight B elements, with one B element in each of the eight PAEs.

The eight outputs correspond to the eight C elements, with one C element in each of the eight PAEs.

The eight outputs correspond to the eight D elements, with one D element in each of the eight PAEs.

The last SMA connection is a direct connection from the RFID Reader.

The RFID Reader has eight ports, seven of those are connected to RF Splitters (six two-way splitters and one four-way splitter). They split one connection into two RF Connections that connect directly into the RFMUX Inputs. These inputs correspond to the elements (A, B, C, D) they intend to fire. When a signal is produced by the RFID reader, it carries that signal from its port, through a RF Coax Cable, to a splitter that sends its signal through the RF Coax Cables. The signal can carry through two RF Coax cables for the two-way splitters or four RF Coax cables for the one four-way splitter that connects to an input SMA. The six two-way splitters will connect to two inputs from one splitter in a combination of [A,B], [A,C], [B,D],and [C,D] for a total of 12 connections to the four element inputs (A, B, C, D). The one four-way splitter connects to all A, B, C, and D inputs.

The RFMUX then takes either a single signal, two signals, or four signals sent to one of the A, B, C, or D inputs and routes that energy to one, two, or four of the corresponding A, B, C, or D outputs. For example, a signal sent two an A input would be routed to one of the eight A elements depending on the NUC's program. The multiplexing of these signals affords the ability to adjust the timing of each element's capacity to fire, subsequently allowing the components to

FIG. 8 (Cont'd)

create a phase-shift. This phase shift would happen when two ports fire a signal in a slight delay relative to the other A, B, C, or D inputs. The RFMUX would then fire the corresponding elements in a delay to create the phase-shift. Ultimately, the logic and sequence of firing is controlled by the NUC ,but the RFMUX allows for one, two, or four elements to fire in sequence or delay.

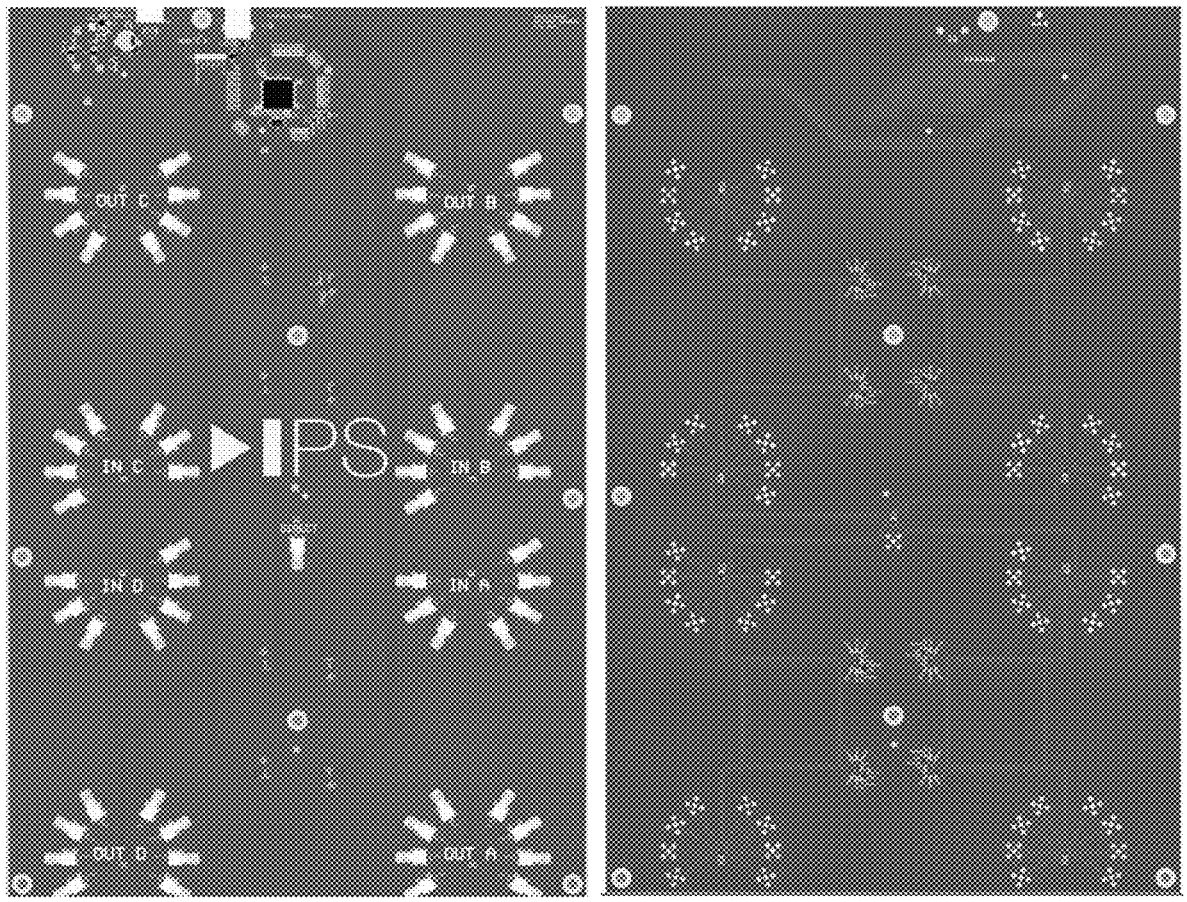

RADIO FREQUENCY IDENTIFICATION-ENABLED TECHNOLOGY, PRODUCTS AND METHODS FOR USE

CROSS-REFERENCE TO RELATED APPLICATIONS

U.S. Provisional Patent Application No. 62/911,761 filed on Oct. 7, 2019 Continuation of U.S. Nonprovisional Patent Application No. 17754618 filed on Apr. 7, 2022

FEDERALLY SPONSORED RESEARCH OR DEVELOPMENT

Not Applicable

INCORPORATION BY REFERENCE OF MATERIAL SUBMITTED ON A COMPACT DISK

Not Applicable

FIELD OF THE INVENTION

The present invention relates, generally, to combining technical radio frequency identification (RFID) interrogation improvements, use of these improvements and data analysis to provide for increased surgical procedure efficiency, efficacy, and patient safety. Specifically, advancements made in RFID enabled technology are utilized to uncover and rectify significant aberrations and inefficiencies, safety concerns and risks involved with surgical procedures through improved surgical implement tracking and related data analysis utilized for gathering, tracking and evaluating of individualized instruments and their use, as well as combinations of said instruments, in practical use.

BACKGROUND

Enhanced RFID technology carries with it the ability to increase the safety of surgical instrument implementation and improved accounting through enhanced detection mechanisms where technological advancements allow for identification, tracking and monitoring through a system that more accurately and effectively detects and follows the precise location of hundreds of surgical tools individually, and in combination. Moreover, this same RFID technology can be exploited to analyze the movements of discrete implements to describe and delineate spatial placement and movement, especially of those implements in close proximity, through monitoring of frequency and duration of use, discreetly and en masse, to 'map out' patterns of implementation that lead directly and precisely to more efficient and economical uses thereof. Ultimately, though, in addition to advancements in surgical implement tracking, it is the patient who benefits via enhanced accountability and increased safety through monitoring and the avoidance of untoward consequences of retained surgical bodies due to human error. (See Retained Surgical Foreign Bodies after Surgery, *Open Access Maced J Med Sci.* 2017 Feb. 15; 5 (1): 97-100, Essentially, RFID technology can be categorized into two types: the first type is 'active' RFID technology, in which a radio frequency ID (RFID) tag or label encompasses an integrated power source (i.e. battery) that allows for transmission of signals and data to a radio frequency antenna/reader, and a second type of 'passive' RFID technology, in which the RF tag has no integrated or embedded power source and instead relies upon an electromagnetic coupling from an antenna/reader wherein the reader transfers power from the reader, though the antenna, to the RFID tag. That tag is then activated (i.e. "energized") through electromagnetic field dispersion and, in this heightened state, can then relay information back to that same reader (also referred to as an "interrogator"). Although, it is within the contemplation of inventor to separate the activation of a tag or tags and the reading/interrogation of those same tags into two separate devices. And, while the tag is, by definition, mobile, the reader or "interrogator" itself may be fixed or mobile wherein fixed readers are set up to create a specific "interrogation zones" which survey a predetermined space or area, as opposed to mobile readers, which are characteristically either hand-held or mounted on mobile transports.

For the purposes of the present invention, it is the 'passive' RFID technology offering the greatest utility. As opposed to 'active' RFID technology, truly 'passive' RFID technology (e.g. those technologies using an active reader and a passive tag) need only two components: an integrated circuit (i.e. microchip) and a transmitting and receiving antenna. This combination constitutes what is more commonly referred to as an 'inlay'. To activate the RFID tag, a reader transmits an interrogation signal to a tag or group of tags in its 'read frequency range'. The tags receive signals through their respective antenna and utilize the received reader's radio wave energy to provide power to the integrated circuit. The tag then uses inductive coupling for near-field effects, and backscatter coupling for far-field effects, to transmit signals back to the reader through the same antenna. Signals transmitted back to the interrogator (here via the backscatter principle) can be made to include information ranging from very simple (e.g. a unique identification number, tag serial numbers, lot numbers and/or production dates), to multi-variant (e.g. environmental information and relation to space) thereby differentiating even physically identical instrument by spatial location, orientation and location in space (via received signal strength, time of arrival and angle of arrival) This allows the reader to determine not only the identity, age, grade and origin of that instrument but also its location relative to the interrogator (as well as other implements) in 2D and even 3D space.

Generally, RFID systems operating at 125-135 kHz and 13.56 MHz function in the near-field and use inductive coupling, while those operating beyond 100 MHz, such as 860-960 MHz and 2400 and 5800 MHZ, operate in the far-field and use backscatter (radiative) coupling wherein transmitter and receiver coupling occurs via either load modulation or backscatter, depending on whether the tags are operating in the near-field or far-field of the interrogator.

And, while passive RFID tags exhibit the disadvantages of high energy requirements (and resultant potential increased interference), short ranges and limited (small) to no memory or power storage, advantages of 'passive' RFID technology generally outweighs these drawbacks to include low cost, robust and simplified construction, light weight, and comparatively superior longevity (as opposed to a battery operated device) with low environmental noise.

Yet, the most intriguing use of passive RFID, is AIDC (Automatic Identification and Data Capture) wherein external data is translated into digital information that can be stored, processed and compared, absent human intervention, to previously recorded information-retrospectively, in real time or prospectively. That information can then be monitored and analyzed to determine the position of 'tagged' items in space and to more efficiently track and systematically trace surgical items for incorporation of various efficiencies, herein discussed, that form the basis of the present invention.

Among the many versions of antenna architectures in 'passive' systems, common forms include (1) linear polarized (vertical or horizontal) antennas and (2) circular polarized antennas where the amplitude of the waves are constant but rotate with time. Whereas a linear polarized antenna communicates with RFID tags best if the transmitting and receiving antenna's electric fields are similarly orientated, the interrogator must nonetheless be "aware" of the tag's orientation in space. Conversely, circular polarized antennas have electric fields that rotate and thus can communicate with RFID tags in any direction normal to the direction of wave propagation where the tag and the reader can be on different planes and the interrogator need not "know" the orientation of the tag. Clearly, as is the case with surgical implements, where specific orientation cannot be controlled and distance between implements is extremely short, circular polarized antennas are manifestly preferred for such tag interrogations.

Historically, though, a major technical limitation for simple static tag systems, with either linear or circular polarized antennas, is electromagnetic shadowing of the fields produced by an antenna/reader where the RFID-enabled items in close proximity to one another cause incomplete reading of RFID tags (e.g., ten items being read as just one tag, individual tags not being read at all or a combination thereof). Essentially, the greater the distance of each tag from one another, coupled with increasing distances from the reader (further in light of incorporated tag and reader ranges and sensitivities), the greater rise is given to aberrations in implement accounting resulting in deviations in implement tracking. Manifestly, RF tags in close relationship and those tags closer to the excitation source (i.e. those RF tags capturing more energy than those further in proximity to the reader) lead to omissions and inconsistencies in implement tracking and monitoring. Improper tracking and accounting gives direct rise to increases in safety risks to patients and ultimately results in flawed data and subsequent inaccurate conclusions which, at best, gives non-productive measurements and, at worst, counter-productive conclusions based on 'bad data' up to and including risks to patient safety. In the context of Healthcare, this technical challenge is a significant constraint to the efficient use of existing products used in the operating room to the detriment of both patient and physician.

Understanding the above, in addition to the primary shortcomings of the effective data capture from RFID-enabled items (being extremely limited and often ineffectual in current RFID-enabled products), current systems are also bulky, taking up precious space in the operating room, and these systems require intensive manual effort and human intervention and input in their operation.

The systems themselves require the user to manually create proximity (separation) between items where implements need to be arranged in a front-facing pattern for interrogation or where a hand-held device must be used to "wand" over RFID-enabled items in order to record each implement and account for each surgical tool individually. In terms of detection, passive UHF (ultra high frequency) systems, wherein higher frequency bands are preferred to provide faster detection speeds, operate on the principle of backscatter communications where RFID tag antennas gather energy from the electromagnetic waves transmitted by the reader and then use that same energy to power an (IC) microchip. This then changes the load on the antenna to achieve backscatter modulation which is then communicated back to the reader thus allowing for the interrogation of the RFID tagged item and the capture of the information from the 'excited' tag-all requiring no reader operator involvement, tool manipulation or moveable "wand" interrogation.

In terms of separation, it is currently suggested that RFID tags need to be separated by approximately 10 cm in order to be reliably detected without significantly increasing the required RF power. Unfortunately, this spatial arrangement is not practical in typical surgical trays given (a) the number of instruments in inventory, (b) instruments inherent spatial proximity and (c) the limited available space provided—each of these concomitant factors requiring several 'workarounds' leveraging existing technology to accommodate the aforementioned infirmities.

While the insufficiencies in accurately and effectively tracking and monitoring surgical instruments are varied and variable, a few of the primary examples of issues faced historically and currently are as described above and below. Chief among the technological impediments are realized as tag sensitivity degradation, defined more specifically as follows:

Tag Detuning, Re-Radiation Cancelation, and Tag Shadowing:

Tag Detuning

Tag detuning is caused by power loss due to a mismatch between tag antenna and an integrated circuit (IC) originating from the impedance change of the tag antenna, when one tag closely approaches the other, where it has been shown that tag detuning has a significant effect when RFID tags are in close juxtaposition (and, inversely, tag detuning having less influence when tags are placed at separations greater than 1 cm). Essentially, tags in a close relationship may absorb power one another, and "de-tune" each other's antenna thereby hampering the tag's ability to receive signals from the interrogator. Furthering this problem, the introduction of metal implement surfaces inherently impedes the originating RF wave thereby further complicating tag detuning (in addition to untoward effects of signal reflecting off of metallic surfaces) where a vast majority of surgical surfaces and implement trays (e.g. mayo trays) are of a metal composition.

Tag Re-Radiation Cancelation

Additionally, the combination of the two electromagnetic signals (generated by both tag and reader) have the potential for combining to at least partially negate each other's signal in the form of 'Tag Re-Radiating Cancelation' where the 're-radiated' waves from the RF tag couple with the produced RF wave from the reader to combine in a manner that leads to interference. In certain instances, and locations, this combined signal interference is destructive, as opposed to constructive, and may prevent accurate implement detection or tag detection altogether.

Tag Shadowing

Further complicating proper detection, 'Tag Shadowing' may also occur where the ability of tags closer to the excitation sources (RF reader) are disproportionately affected by the electromagnetic waves generated from the RF Reader and capture more energy than tags further away due to close proximity to the reader. The tags at a further distance from the excitatory impulses (electromagnetic energy) of the reader may be masked and read more inefficiently (or omitted entirely at extended distances), essentially "shadowed" by more immediate tags, whereas those tags closer to the reader's impulses are received with greater clarity.

Existing technology must recognize and account for all of the limitations (e.g. Tag detuning, Re-radiation cancelation, and Tag Shadowing) in the field. One way to account for these systems is to implement a manual "work around", meaning the user must manually steer the reader generated RF field in multiple directions as to not create destructive interference on the backscatter communication whereby tags further away (being shadowed by another tag) can manually be excited at the same rate and to the same extent as other closer, tags through varying the distance from reader to tag—physically facilitating proper interrogation. For example, if a reader is producing a field in an omnidirectional fashion, the accuracy can deteriorate due to one or more issues. Most commonly, though, interference due to tag shadowing and re-radiating cancelation stand to have the greatest detrimental effects. As waves progressing in all directions interrogate tags, the backscatter communication causes destructive interference canceling out the RF signal ordinally sent, while tags that are further away from the wave capture inadequate energy for return transmissions due to tag shadowing and are either poorly or never activated. This results in inadequate (i.e. weak) or no re-communication with the reader. Instinctively, to account for and accommodate tag detuning, increases in RF power generated at the reader and/or omni-directionally projected RF waves may seem an adequate solution by transmitting (1) an extended wave propagation and (2) enabling interrogation of all tags, at close and distanced proximity, thus capturing both strong and attenuated signals. Yet, with increased power and extended multi-path wave propagation comes increased rates of re-radiating cancelation—especially at greater distances—negating the gains and appeal of increased power and multi-path wave transmittance.

Moreover, inventors recognize that extension of radio frequencies in several planes and various directions, in order to seek greater accuracy in detection, harbors a greater potential for "spillover" or "bleed" into adjacent areas. "Spillover" here defined as RF waves extending beyond the intended area thereby interfering with another, adjacent antenna system (i.e. deconstructing adjacent system's signals and/or causing a decrease in the saturation of the wave, which could further exacerbate electromagnetic shadowing of tags). "Spillover" alone, in combination with augmented tag detuning, re-radiation cancelation, and tag shadowing adds to the myriad of issue heretofore unresolved in RFID technology leading to untoward consequences of increased power generation adding to a list of needs that continue to be unmet.

While strides have been made to overcome the inadequacies of tracking and monitoring surgical tools, it remains evident that considerable failings remain in the field. It is therefore an object of the present invention and method of use to remedy these shortcomings as to provide for increased patient safety and efficient surgical implement tracking and monitoring.

Of note, while inventor has set forth the best mode or modes contemplated of carrying out the invention known to inventor such to enable a person skilled in the art to practice the present invention, the preferred embodiments are, however, not intended to be limiting, but, on the contrary, are included in a non-limiting sense apt to alterations and modifications within the scope and spirit of the disclosure and appended claims.

SUMMARY OF THE INVENTION

The present invention, in certain and not necessarily all aspects and features, discloses a new and novel RFID monitoring and tracking system (including configuration and use) addressing (1) an invention directing a wave signal in such a manner as to capture items even when they are obstructed by another item or in close contact or proximity with one another (i.e. shadowing), (2) decreasing or eliminating current disparities experienced in reading items in close proximity, and aberrations due to tag detuning, re-radiation cancellation, and spillover of tag reading systems, (3) decreasing the size of monitoring systems where the current system is compact compared to existing systems but conserves (and even expounds upon) all of the original functionality and (4) adding flexibility to element configurations through addition and subtraction of modular elements. Finally, while developing the antenna architecture, inventor's recognize the shortcomings of some of the most pressing technological constraints and set out to build a system which (1) produces an RF field in the 20"-30" in range, (2) interrogates RFID enabled items with upward of 99.9% accuracy (regardless of orientation or proximity) (3) "reads" separately up to 300 items in density (delineating even items placed one on top of each other or in an overlapping fashion), (4) continuously and passively scans items placed in the RF field generated by the system, and a system that (5) works both autonomously and instantaneously to interrogate RFID tags in sub-second time frames.

In particular, the current invention produces a RF field that operates between the frequency of 902-928 MHz (in accordance with the North American Industrial Scientific Medical (ISM) band) as defined by ISO/IEC 18000-6:2013 for RFID devices operating in the 860 to 960 mHz ISM band with an effective range of at least 24 inches (typically 3 to 39 feet) that can interrogate (read) RFID enabled items up to and including 300 items with 99.9% accuracy-regardless of item orientation or proximity to other items.

The present invention, as well, utilizes an algorithmically assisted platform with which to (a) track and (b) assess the duration of use of surgical implements which are then categorized according to temporal and spatial utilization. The former (a) tracking of instruments, individually, speaking to the safe use and recovery of surgical instruments and the later (b) concerned with efficiency, use and effective inventory controls. Yet, the two are not mutually exclusive where strict inventory requirements relate directly to safe use and recovery of surgical tools and the safe utilization of instruments are necessarily highly monitored and regulated. But it is the study and analysis of tool movement and placement that is far more nuanced and deserving of description as opposed to simply inventory.

Correspondingly, surgical implements may be observed to adhere to the following criteria characterizing instrument utilization wherein:

(1) 'rare use' is defined by an instrument utilized within 30 consecutive surgeries;
(2) 'minimal use' is defined by an instrument utilized within 20 consecutive surgeries;
(3) 'moderate use' is defined by an instrument utilized within 10 consecutive surgeries; and
(4) 'non-use' resulting in instrument removal form a surgical set.

And, although, 30, 20 and 10 consecutive surgeries are used above, these criteria are easily amendable and may be modified according to a particularized procedure or subset of procedures, type of operating room, type of facility or any other user defined parameter.

Further, the same algorithmic parameters may be established to equate individual instrument movements which are tracked to either necessitate adoption, modify inclusion and/or remove instruments from inventory based on temporal and spatial location wherein an instruments' movement from a primary storage location to a receiving station (e.g. mayo tray) constitutes a "movement", instrument movement to a patient constitutes another "movement" and instrument movement to any other field constitutes a third "movement" (e.g. back to a surgical tray, to another repository or back table). Succinctly, movement from a storage area (or secondary table) to a "mayo tray" can result in a number of subsequent conditions being met going forward: (1) the instrument may be moved from the mayo tray and replaced back into the storage area, (2) the instrument may be used then placed back on the mayo tray, (3) the instrument may be used in or on the patient, (4) the instrument may be placed in an auxiliary receptacle or (5) the instrument may simply be dropped-all resulting in informative placements and replacements that can be monitored, analyzed, quantified and utilized for instrument supervision, safety and effective inclusion or exclusion from instrument inventory.

What is more, the third condition (i.e. where the instrument is used in or on the patient), may be dissected further to determine the time of use in operation wherein, not only is the location of the instrument determinable, but also the duration of use. As a function of time, if the instrument is placed over or within the patient's field for designated time periods, this then may evidence, in addition to frequency of use, an informative 'length of use' wherein:

(1) 'minimal use' is defined by instrument utilization of 15 seconds or less;
(2) 'moderate use is defined by utilization more than 15 seconds but fewer than or equal to 60 seconds;
(3) 'high use' is defined by instrument use of over 60 seconds but less than or equal to 300 seconds; and
(4) 'extremely high use' is defined by instrument utilization of 300 seconds or more.

It is to be understood that these parameters are by way of example only and may be modified as per the user's determinations of length of use time without departing from the contemplated goal of determining instrument use, frequency and duration.

BRIEF DESCRIPTION OF THE SEVERAL VIEWS OF THE DRAWINGS

A more particular description of certain, but not all, embodiments of the invention briefly summarized above may be had by reference to the preferred embodiments which are shown in the drawings forming a part of this specification.

These drawings illustrate embodiments envisaged at the time of filing for this patent and are not to be used to improperly limit the scope of the invention which may have other equally effective or equivalent embodiments.

FIG. 8 depicts an RF multiplexer.

Certain embodiments of the invention are shown in the above-identified figures and various aspects and features of embodiments of the invention are described below. Any combination of aspects and/or features identified above or described below can be used in combination except where such aspects and/or features are mutually exclusive, incompatible or contradictory.

It should be understood that the appended drawings and description herein are of certain embodiments and are not intended to limit the invention or cover each and every permutation of the invention. On the contrary, the intention is to cover all modifications, equivalents and alternatives falling within the spirit and scope of the invention as defined by the appended claims. In showing and describing these figures in preferred embodiments, the figures are not necessarily to scale, and certain features and certain views of the figures may be exaggerated in scale or in schematic in the interest of clarity. in terms of modular design, certain PAEs of the present invention may be combined in different 2×2 configurations as to accommodate various instruments sets as well as spatial requirements.

As used herein and throughout all the various portions (and headings) of this patent, the terms "invention", "present invention" and variations thereof mean one or more embodiments and are not intended to mean the claimed invention of any single particular embodiment. Any aspect or feature or combination of aspects or features of any embodiment disclosed herein may be used in connection with any other compatible embodiment disclosed herein. The present invention includes a variety of aspects, which may be combined in different ways as may be desired to achieve certain specific results.

The following descriptions are provided to list elements and describe some of the embodiments of the present invention and the various described examples and embodiments should not be construed to limit the present invention to only the explicitly described systems, techniques, methods and applications.

Although there may be a description of operation(s) as a sequential process, many of the operation(s) can be performed in parallel or concurrently. In addition, the order of the operations may be rearranged to accommodate specific processes or performance requirements or data accumulation wherein not all operations or steps in any particularly described method or process may occur in all embodiments.

DETAILED DESCRIPTION

Figure 1B:
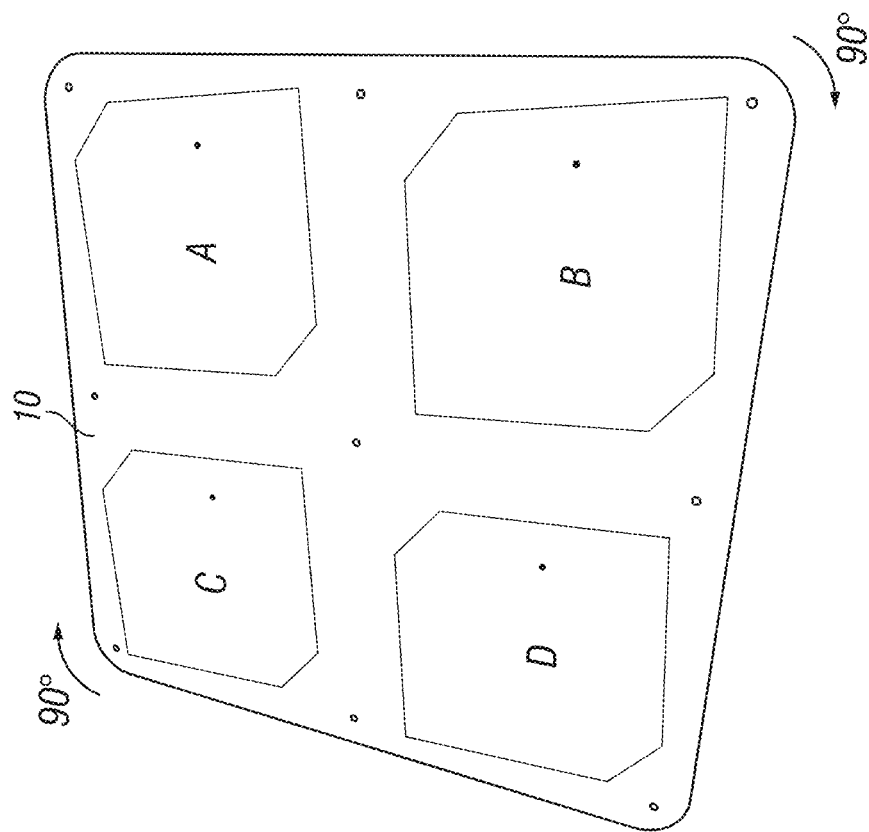
FIG. 1b depicts a 90-degree rotated view of FIG. 1a of a low-profile patch antenna.
Figure 1A:
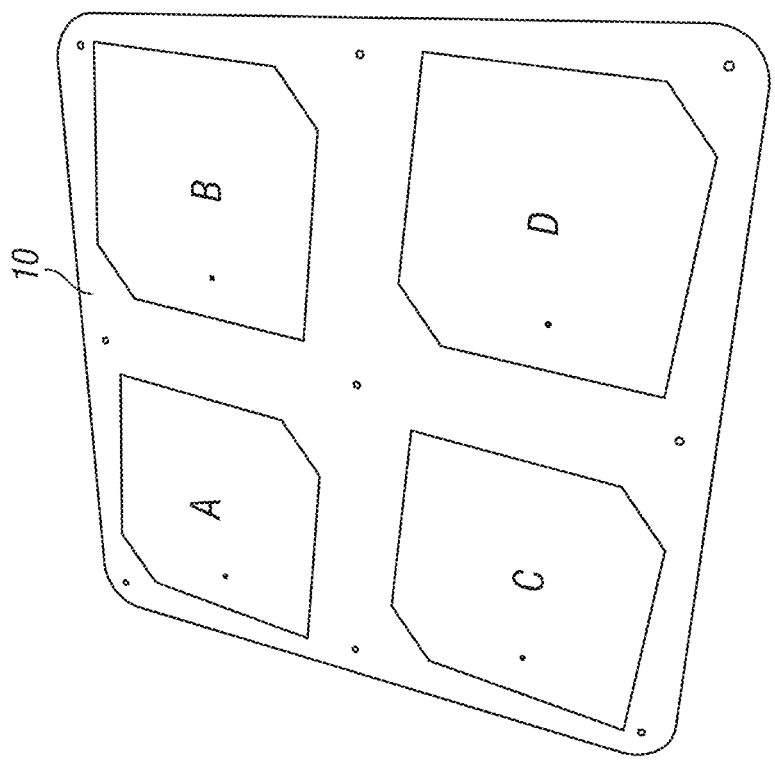
FIG. 1a depicts a front view of a low-profile patch antenna.

FIG. 1a details a front-facing view of a low-profile patch antenna and FIG. 1b details a 90 degree rotation of the front-facing view of a low-profile patch antenna of FIG. 1a, respectively, wherein each antenna contains four individual elements (A, B, C, D) in a 2×2 pattern, referred to as the Patch Antenna Element (PAE) array 10. The PAE 10 design affords the present invention the ability to emit an RF wave (i.e. "fire") from any individual element (A, B, C, D) within the Patch Antenna Element array 10 at a single time. This flexibility allows for more coverage from the RF waves produced by the PAE 10 as a whole. The dynamic nature of the invention allows for the ability to provide significant coverage by orienting the PAEs 10 into a series, quadrant, or other form factor whereby RFID tags are actuated discriminately thus allowing for phase shifting or phased array (creation of beams of radio waves) of RF waves that are electronically steered through antenna element (A, B, C, D) activation (as opposed to manually "hand" steered) without necessitating movement in the transmitter (interrogator). The phased array antenna can thus provide constructive or destructive interference, based on particular spatial angles, as to direct or "steer" RF beams in a particular direction. Individually, a transmitter provides power to discrete antenna elements (A, B, C, D) through a phase shifter which alters the phase electronically to steer the RF waves. In a dynamic phase array, an array of variable phase shifters is used to move a beam and adjustable phase shifters are collectively used to move the beam with respect to the array face. The use of this 'dynamic' phase array is especially desirable in that this allows for the present invention to simultaneously monitor multiple targets while continuing to search for new targets in a given field. In addition, the ability of the present invention to selectively interrogate distinct tags precisely by directional signal processing (via directing an RF wave) in order to achieve spatial selectivity (a process more commonly referred to as 'beamforming') further enhances the phase array techniques, through manipulation of phase and/or amplitude, in order to inform precise localization accuracy. Thus, by properly receiving (amplified) tag signals and minimizing tag interference (discussed above) through angulation (received angles of arrival) the transmittance side from the interrogator may generate more accurate weighted antenna array signals. This allows for subsequent improvements in signal to noise ratio and enhanced tag readability in a 3-dimensional (3D) environment.

Figure 2:
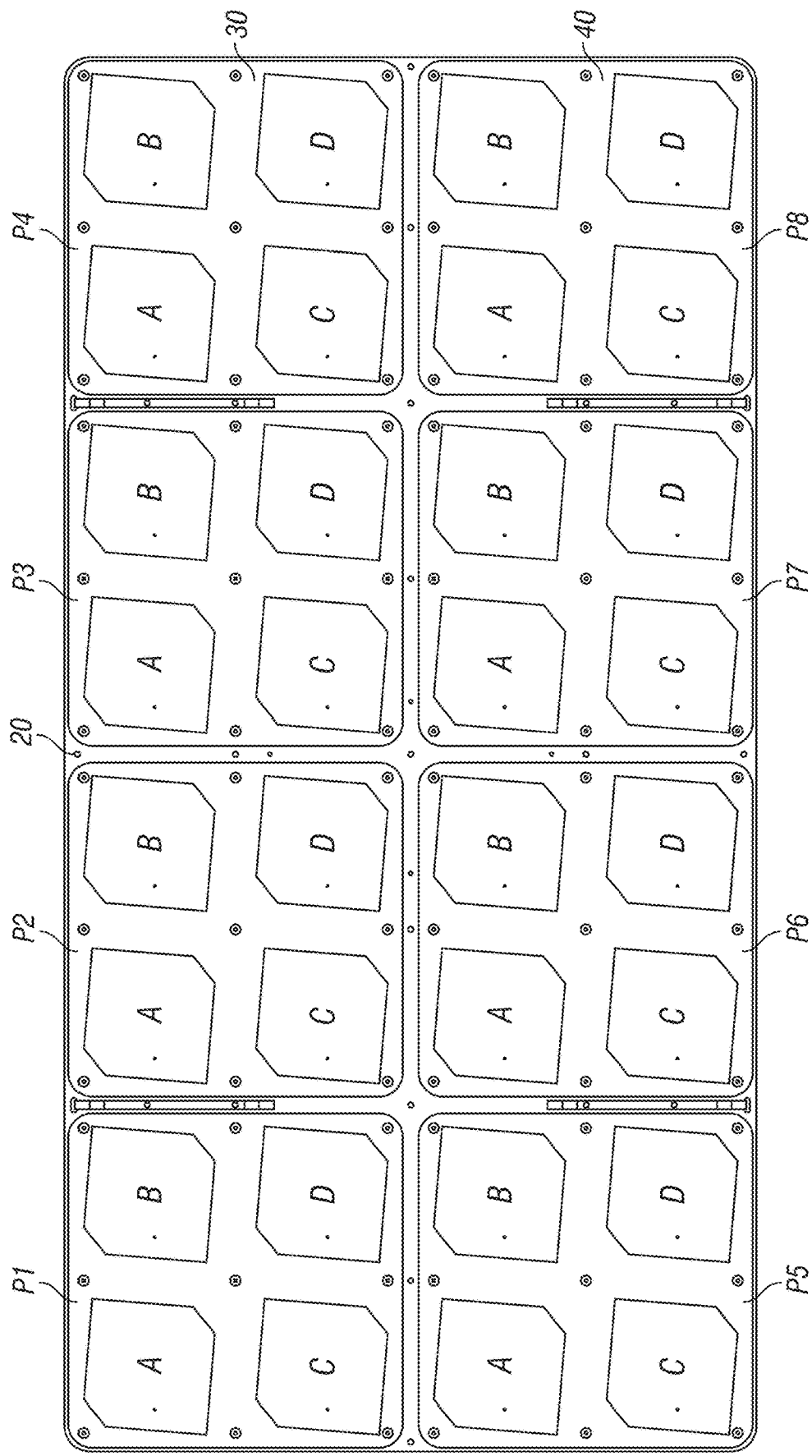
FIG. 2 is a model of the Patch Antenna Element (PAE) depicted in FIG. 1 scaled into a series of eight PAEs.

Further, FIG. 1 depicts a key component (the 2×2 element configuration) provisioning an PAE 10 that is scalable upward (and downward) into various form factors utilizing a number of 2×2 (PAE) elements 10 (as illustrated in FIG. 2). This scalability of the PAE 10 design gives rise to further capabilities related to the invention as a whole in terms of the ability to retrofit the present invention into a variety of applications and a wide assortment of environment-specific orientations.

FIG. 2 represents a model of the PAE 10 depicted in FIG. 1 scaled into a series of eight antennas—4 upper Patch Antenna Elements (PAEs) consisting of PA, P2, P3 and P4 (collectively 30) and 4 lower Patch Antenna Elements (PAEs) consisting of P5, P6, P7 and P8 (collectively 40). Each individual PAE contains four of its own elements (A, B, C, D) wherein P1 would consist of P1-A, P1-B, P1-C and P1-D, P2 would consist of P2-A, P2-B, P2-C and P2-D and so on for P3 through P8. This preferred embodiment of the invention shows the scalability allowed for in this invention that is strictly exemplary and is amenable to any configuration and size that will support the four (4) element PAE 10 design of FIG. 1. Through the RF Multiplexor (RFMUX), one element may be fired at any given time. In addition, two to four elements may be fired simultaneously, but only one element can be fired by each PAE at one time. For example, having four PAEs constructed in a 2×2 quadrant with a totals of 16 elements (four antenna elements (A, B, C, D) per PAE 10), The RFMUX can fire one antenna element (A, B, C or D) at a time for each of the four PAEs (30, 40) so that all 16 elements fire over an extended period of time. Additionally, the RFMUX can fire two elements simultaneously or on a delay, as long as those two elements do not belong within the same PAE 10. For example, two adjacent elements may be activated from two different PAE's (e.g. P1-D and P2-C or P6-B and P7-A). Finally, the RFMUX can fire four elements simultaneously or on a delay, as long as those four antenna elements (A, B, C, D) do not belong within the same PAE 10. Within the PAE 10, the four elements that may fire would be all of the adjacent elements in the center of the quadrant (e.g. P1-D, P2-C, P5-B and P6-A or P3-D, P4-C, P7-D and P8-A).

Figure 3:
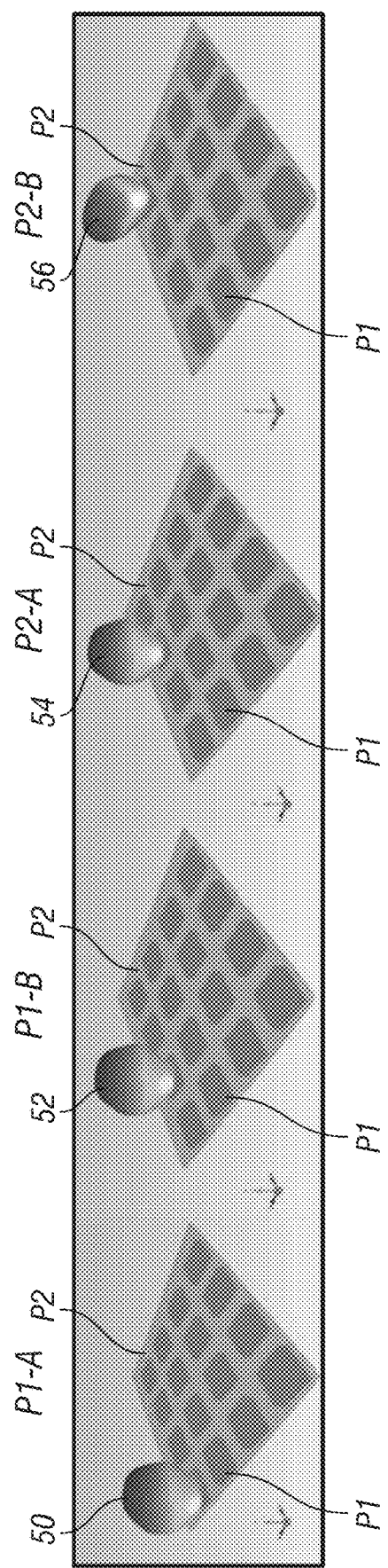
FIG. 3 is an RF simulation model containing four PAEs in various modes of antenna element activations.

FIG. 3 evidences an RF simulation module containing four PAEs, each containing 4 individual antenna elements, oriented in a square whereby each PAE evidences 4 antenna elements, each in a 2×2 array. This figure shows the ability of the array to activate or "fire" four elements (i.e. RF wave interrogations), in sequence, across the top two adjacent PAEs, from left to right. This PAE layout is similar in design to the first four PAE 10 arrays in FIG. 2 whereas FIG. 3 is one-half of the eight PAE configuration (30, 40). By way of example, four adjacent PAEs 10 can fire one antenna element simultaneously or with a slight delay in relation to other antenna elements: however, not all four elements within one PAE fire simultaneously. The ability to fire two to four elements between two to four adjacent PAEs allows for phase-shifting, and ultimately beamforming spatial directivity, to occur wherein tags residing above the PAE 10 may be identified through reader interrogation regardless of orientation or proximity in a defined 3D space. FIG. 3 shows a top left PAE P1 antenna element P1-A firing, top left PAE P1 antenna element P1-B, a top right PAE P2 antenna element P2-A, and a top right PAE P2 antenna element P2-B "firing" sequentially.

Figure 4:
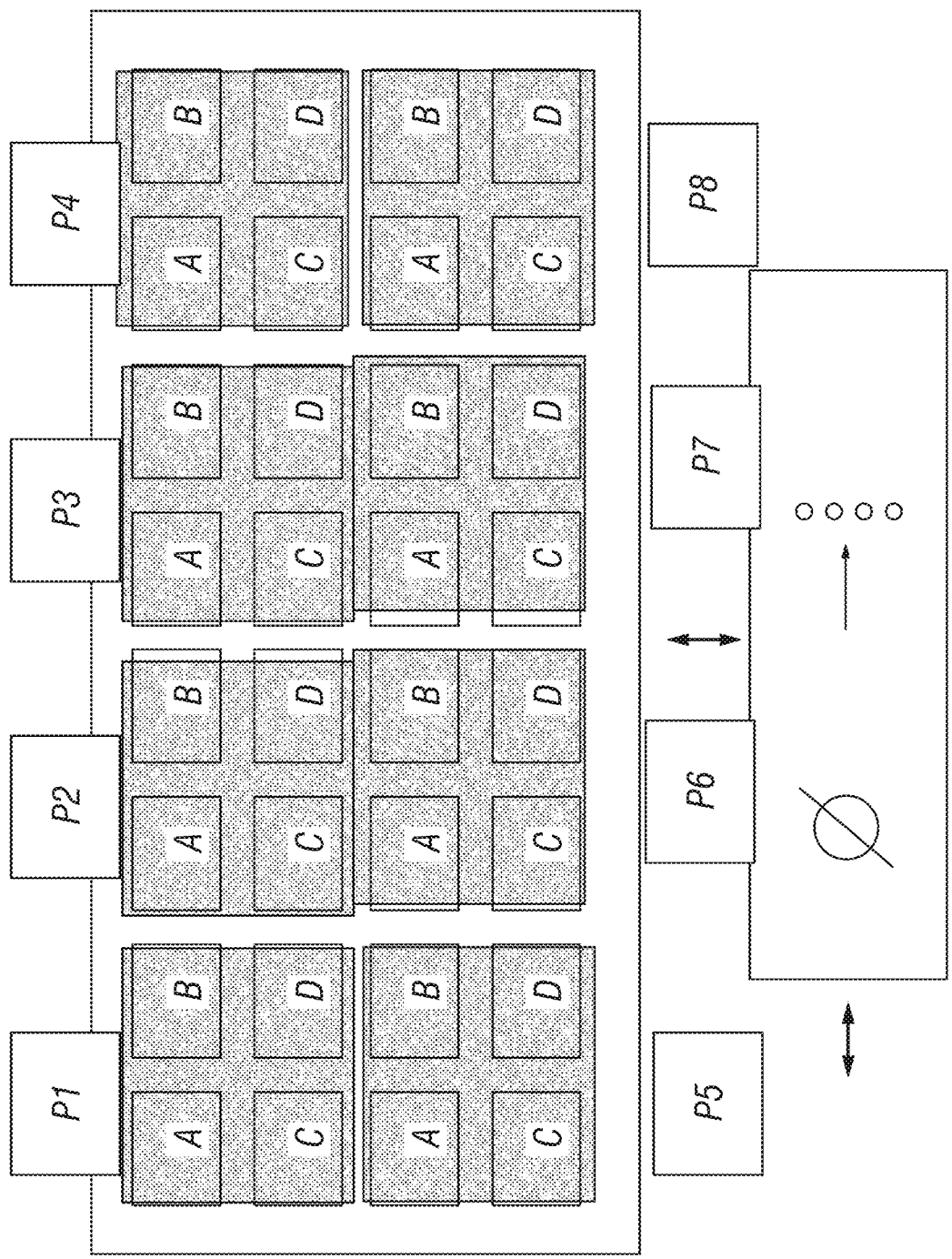
FIG. 4 represents eight PAEs consisting of a top row of 4 PAEs and bottom row of 4 PAEs.

FIG. 4 illustrates an eight PAE configuration (P1, P2, P3, P4, P5, P6, P7, and P8), as in FIG. 2, wherein each corresponding antenna element is labeled (A, B, C, and D). This means there are eight A antenna elements, eight B antenna elements, eight C antenna elements, and eight D antenna elements creating a total of 32 elements (four elements for each PAE 10 (P1, P2, P3, P4, P5, P6, P7, and P8), with each PAE 10 having one A antenna element, one B antenna element, one C antenna element, and one D antenna element) Phase-shifting occurs when firing two to four elements, from each of selected PAEs (P1, P2, P3, P4, P5, P6, P7, and P8), based on a prior reflection data of the received RF wave, relative to the delay of the elements firing, causing the generated RF wave (50, 52, 54 and 56) to angle to a newly computed direction. Controlling the element firing delay means one controls the phase shift. This means one can control the angle at which the beam is formed, creating a new dimension to the system. Controlling the direction of the RF wave propagation, that would otherwise go upwards, can illuminate RFID enabled items that are otherwise shadowed from other items. This capability removes the traditional manual intervention needed to direct the RF wave to an alternate angle, allows for directed interrogation, shortens the required wavelength and therefore decreases the power required for tag locating. This phase shifting array and directed spatial location, in addition to lowering power requirement, avoids the aforementioned infirmities of tag detuning, re-radiation cancelation, tag shadowing and spillover while providing for greater accuracy even for those implements in very close juxtaposition to one another. By way of yet another example, firing Element D in P2, Element C in P3, Element B in P6, and Element A in P7 (with element D in P2 and element A in P7 delayed) forms a beam that provides a new angle to illuminate tags that would otherwise be hidden by other RFID enabled items or metal instruments. This is vitally important in that without this capability, an attempted tag interrogation could result in a read error by the system, or designate that an item is missing, when in fact it cannot be interrogated. Historically, this would force the user to intervene in the process with either a hand-held item to scan over the area that produces a different angle for the RF Wave to penetrate.

Additionally, where, as in FIGS. 2 and 4, a RF multiplexer hardware element may provide an RF path, including the phase of the RF to and from each antenna element, via activation of a selected antenna element(s) in an array as per the following schedule:
1. any individual antenna element in a 4-antenna element cluster (i.e. PAE);
2. an array of any antenna element (A, B, C, or D), individually, on any one of PAE P1, P2, P3, P4, P5, P6, P7, and P8, sequentially, simultaneously, or a combination thereof, in order to adequately interrogate individual tags (via received angles of arrival and subsequent beamformed transmissions;
3. an array of any A and B element sequentially, simultaneously, or a combination thereof, in order to adequately interrogate individual tags (via received angles of arrival and subsequent beamformed transmissions;
4. an array of any A and C element sequentially, simultaneously, or a combination thereof, in order to adequately interrogate individual tags (via received angles of arrival and subsequent beamformed transmissions;
5. an array of any A and D element sequentially, simultaneously, or a combination thereof, in order to adequately interrogate individual tags (via received angles of arrival and subsequent beamformed transmissions;
6. an array of any B and C element sequentially, simultaneously, or a combination thereof, in order to adequately interrogate individual tags (via received angles of arrival and subsequent beamformed transmissions;
7. an array of any B and D element sequentially, simultaneously, or a combination thereof, in order to adequately interrogate individual tags (via received angles of arrival and subsequent beamformed transmissions;
8. an array of any A and D element sequentially, simultaneously, or a combination thereof, in order to adequately interrogate individual tags (via received angles of arrival and subsequent beamformed transmissions;
9. an array, sequentially, simultaneously, or a combination thereof, of any of the preceding schedules above.

Figure 5:
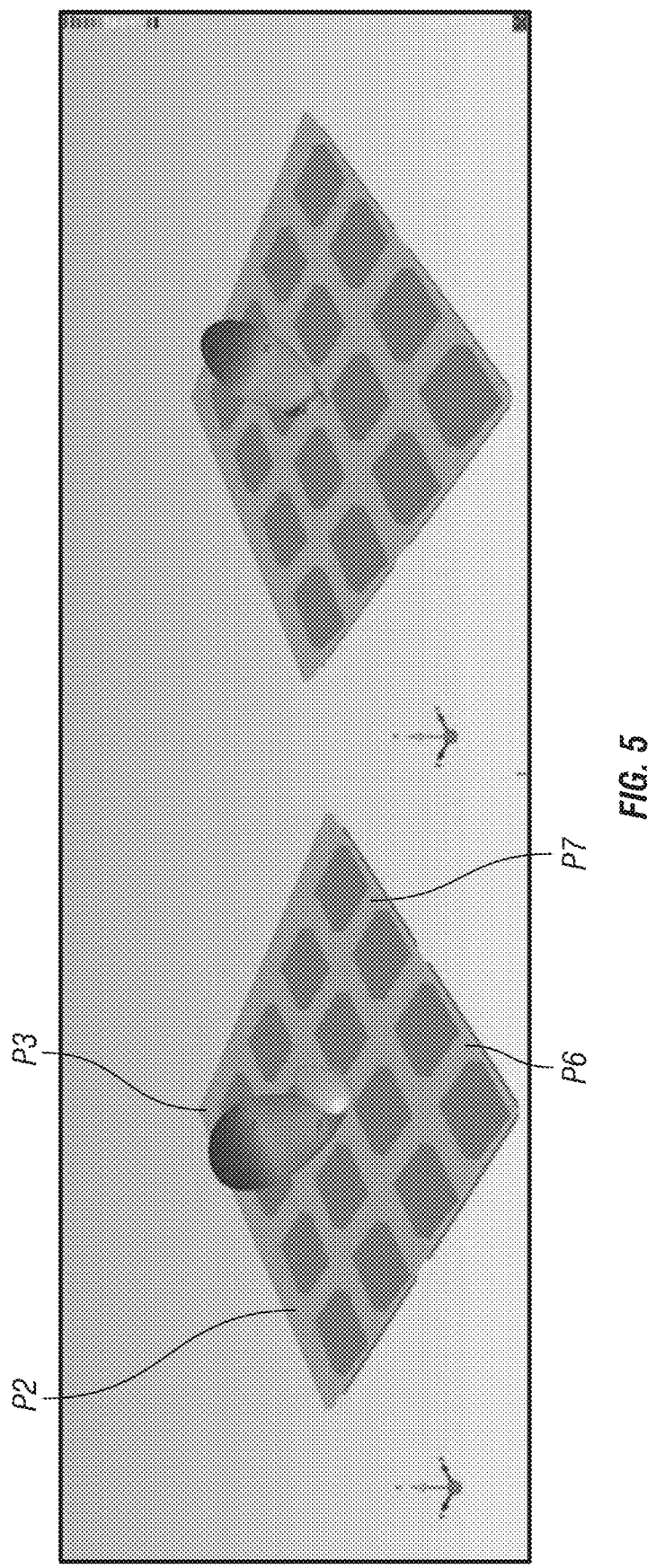
FIG. 5 depicts the capacity to switch the angular diction of the RF wave within a group of elements.

FIG. 5 evidences the result of phase shifting and the capability of the present invention to change the angular direction of the RF wave within a group of elements (per the above schedule), controlling phase shifting and beam forming through the relative delay and sequential and/or simultaneous activation and delayed activation, the direct and steer the angle of a beam's formation. Carrying the above example forward from FIG. 4, the produced beam forms in the Y+ direction through the reflection of the RF wave propagating from Element C from P3 (obscured by the formed wave) and Element B from P6 and the slight firing delay of Element D from P2 and Element A from P7.

Conversely, delaying Element B in P6 and Element C in P3 would direct the RF wave in the Y-direction through the reflection of the RF wave propagating from Element D from P2 and Element A from P7 and the slight firing delay of Element B from P6 and Element C from P3.

Figure 6:
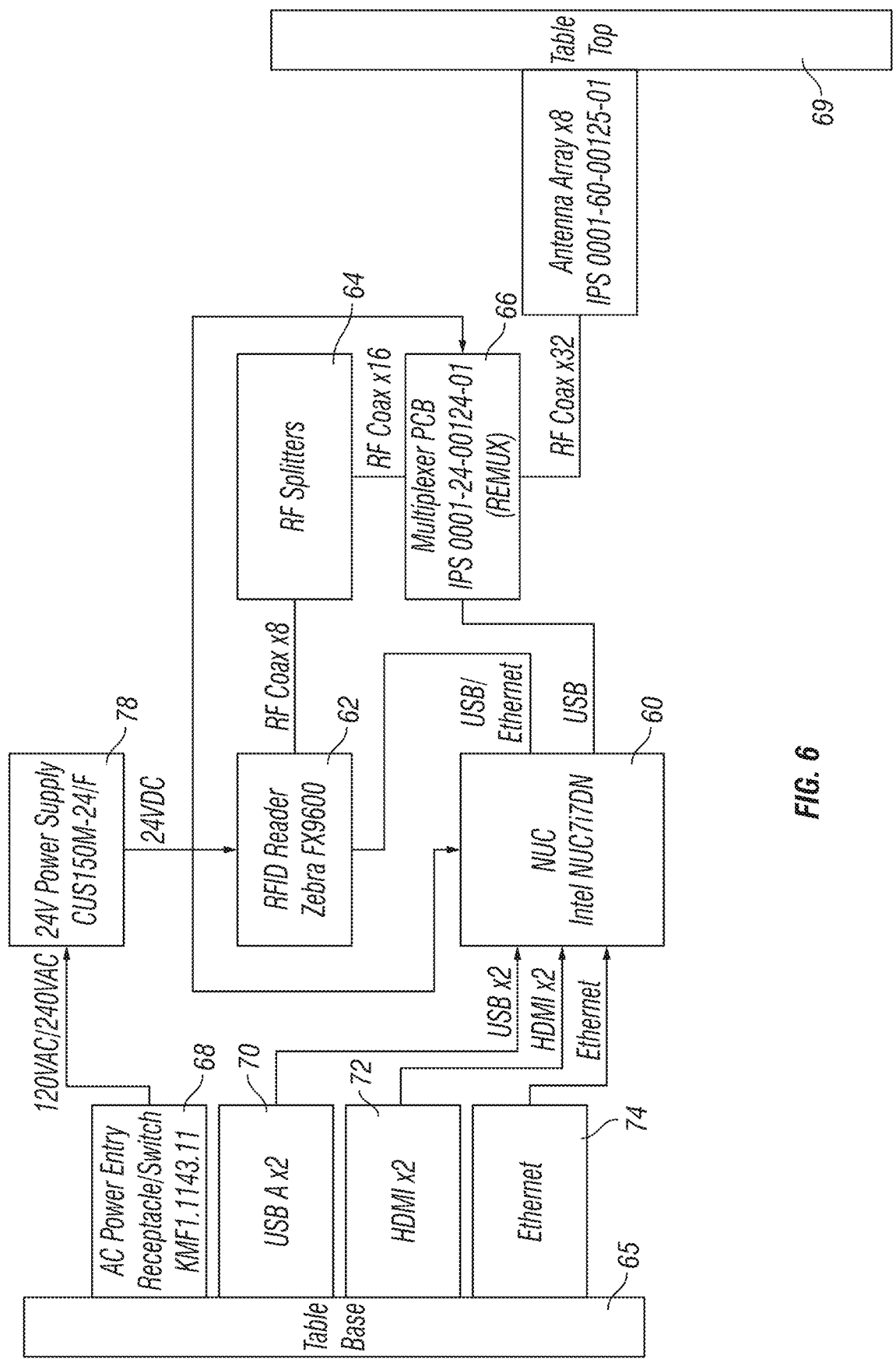
FIG. 6 is a schematic representation of operable components of the present invention.

Therefore, by controlling the sequence and order of antenna(s) being activated, through a programmable Next Unit of Computing 60 (NUC) (See FIG. 6) The NUC 60 is a single board computer that is instrumental to the logic of the system. While most systems are forced to run static wave propagation from an RFID/Antenna array, the NUC 60 allows for much more flexibility. This flexibility allows the system to run many different firing sequences across the 32 elements within each PAE 10. The NUC 60 runs a pre-programmed command protocol that instructs the reader to activate a specific port. Depending on which port gets activated, the corresponding element will fire either individually, two at a time, or four at a time. The RFID reader 62 has eight ports with seven ports being connected to RF Coaxial Cables that are connected to RF Splitters 64. The remaining port connects to a RF Coaxial cable that connects directly to the RF Multiplexor (RFMUX) 66. The RFMUX 66 itself comprises four groups of SMA input connections (eight total for each group) that correspond to the A elements, B Elements, C Elements, and D elements of each PAE 10. Additionally, there are four groups of output SMA connections that would connect to the 32 elements among the eight PAE's 10.

The seven ports from the RFID reader 60 connect to RF Splitters 64 (six two-way splitters and one four-way splitter) where they split one connection into two RF Connections that connect directly into the RFMUX 66 Inputs. These inputs correspond to the elements (A, B, C, D) they intend to fire. The six two-way splitters will connect to two inputs from one splitter in a combination of (A,B), (A,C), (B,D) (C,D) etc. and total 12 connections to the four element inputs (A, B, C, D). The one four-way splitter connects to all A, B, C, and D inputs. The NUC's 60 pre-programmed protocol instructs a specific sequence of firing commands to the RFID reader 62, which in turn energizes a port, that signals the (RFMUX) 66 to actuate, one to a plurality of elements may be instructed simultaneously or sequentially in order to create a phase-shift between elements to beam form an RF wave to interrogate RFID enabled items and to receive reader electromagnetically-induced, activated RFID tag information As detailed and depicted in FIG. 6, the present invention is operable through the combination of delineated components. These components are utilized to integrate and control PAEs 10 and their corresponding individual elements in order to interrogate RFID enabled surgical elements, without regard to orientation or proximity. Expressly, the RFID Reader 62, the NUC 60, and the Multiplexor (RFMUX) 66 direct phase-shifting and beamforming by power 68 activating the RFID Reader 62 and the NUC 60. Once the RFID Reader 62 is activated, along with the NUC 60 a pre-programmed command protocol is activated that instructs the RFID reader 62 to fire a specific port, which connects to one of the inputs on the RFMUX 66 to actuate, one to a plurality of antenna elements (A, B, C, D) may be instructed simultaneously or sequentially in order to create a phase-shift between elements to beam form an RF wave to interrogate RFID enabled items and to receive reader electromagnetically-induced, activated RFID tag information by instituting a command protocol that fires elements from the PAE's 10 in a specific pattern. This sequence can continuously change so that the accuracy can be optimized given the embodiment of the technology. The power 68 activating on the NUC 60 and RFID reader 62 will remain consistent. The system offers flexibility by having multiple connection options from the table base 65 including USB 70, HDMI 72, or Ethernet 74. The 24 V power 78 turns on the RFID reader 62 and the NUC 60. This power 68 translates to a signal sent by the RFID reader 62, which is controlled by a pre-programmed command from the NUC 60. This signal comes from one of the eight ports that connect to the RF Splitters 64. The RF Splitters 64 then communicate with one or more inputs on the RFMUX 66, which then controls the firing of one, two or four of the 32 antenna elements (A, B, C, D) within one or more PAE's 10.

Moreover, it is this configuration that allows for the utmost flexibility in creating phase-shifting among antenna elements. This phase-shifting allows for beam forming, and the subsequent control over the direction of the beam. Having the ability to continuously alter the sequence of the elements firing means you can continuously shape the beam to illuminate all of the RFID tagged items regardless of their proximity, or whether or not they are hidden/shadowed by metal or other RFID enabled items.

Figure 7:
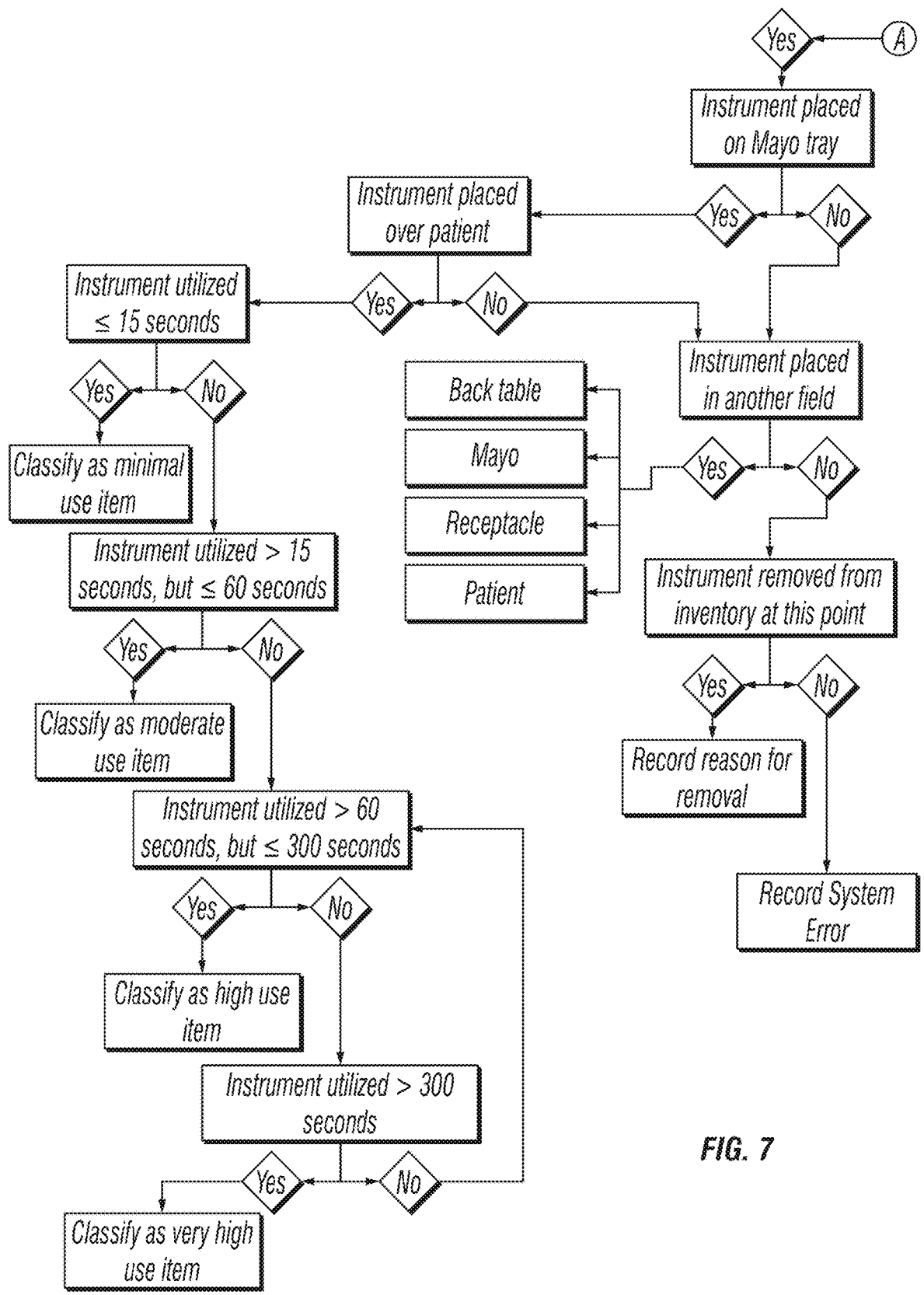
FIG. 7 illustrates a classification and regression algorithm to determine implement use.
Figure 7:
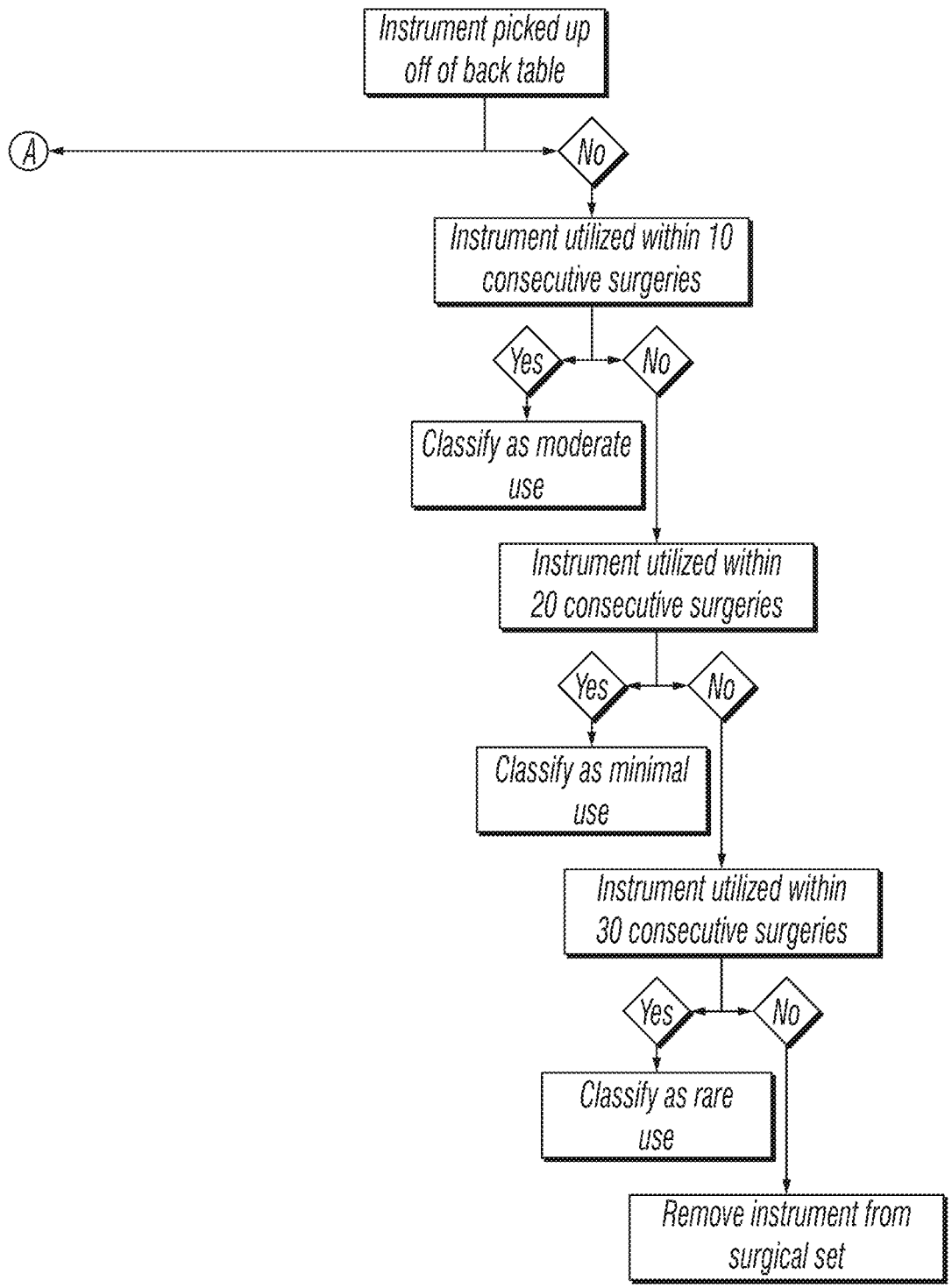

FIG. 7 depicts a classification and regression algorithm for the movement of an instrument from a back table to a Mayo Tray, from a Mayo Tray to a Patient, from a Patient to back to a Mayo Tray and from a Patient to another field (back table or Mayo Tray). Further FIG. 7 evidences the duration of instrument utilization (i.e. minimal, moderate high use) and an instruments use in consecutive surgeries (e.g. moderate, minimal, rare and non-use).

FIG. 8 illustrates one embodiment of the RF Multiplexer (RFMUX) 66. The RF Multiplexor 66 was created to fire individual elements, between two to four elements at a time, while also being able to correctly fire each element based on the sequence received from the NUC 60. This is done through the RFID reader 62 and RF Splitters 64, connecting the eight ports from the RFID reader 62 and to the RFMUX 66. As the figure shows, there are a total of 61 SMA connections on the multiplexor. 28 (twenty-eight) of the SMA connections correspond to the A, B, C, and D inputs designated IN A, IN B, IN C, IN D. This means there are seven input connections for A, B, C, and D.

32 SMA connections correspond to the A, B, C, and D outputs. They are designated OUT A, OUT B, OUT C, and OUT D. This means there are eight output connections for A, B, C, and D, wherein:

The eight outputs correspond to the eight A Element, with one A Element in each of the eight PAEs.

The eight outputs correspond to the eight B Element, with one B Element in each of the eight PAEs.

The eight outputs correspond to the eight C Element, with one C Element in each of the eight PAEs.

The eight outputs correspond to the eight D Element, with one D Element in each of the eight PAEs.

The last SMA connection is a direct connection from the RFID Reader.

The RFID Reader 62 has eight ports, seven of those are connected to RF Splitters 64 (six two-way splitters and one four-way splitter). RF Splitter 64 split one connection into two RF Connections that connect directly into the RFMUX 66 Inputs. These RFMUX 66 Inputs correspond to the elements (A, B, C, D) they are designated to fire. When a signal is produced by the RFID reader 62, the RFID reader 62 carries a signal from its port, through a RF Coax Cable, to an RF splitter 64 that sends its signal through the RF Coax Cables. The signal can carry through two RF Coax cables for the two-way splitters or four RF Coax cables for the one four-way splitter that connects to an input SMA. The six two-way splitters will connect to two inputs from one splitter in a combination of (A,B), (A,C), (B,D), and (C,D) for a total of 12 connections to the four element inputs (A, B, C, D). The one four-way splitter connects to all A, B, C, and D inputs.

The RFMUX 66 then takes either a single signal, two signals, or four signals sent to one of the A, B, C, or D inputs and routes that energy to one, two, or four of the corresponding A, B, C, or D outputs. For example, a signal sent two an A input would be routed to one of the eight A elements depending on the NUC's 60 program. The multiplexing of these signals affords the ability to adjust the timing of each element's capacity to fire, subsequently allowing the components to create a phase-shift. This phase shift would happen when two ports fire a signal in a slight delay relative to the other A, B, C, or D inputs. The RFMUX would then fire the corresponding elements in a delay to create the phase-shift. Ultimately, the logic and sequence of firing is controlled by the NUC 60, but the RFMUX 66 allows for one, two, or four elements to fire in sequence or delay.

PREFERRED EMBODIMENTS

The drawing figures and below described embodiments are exemplary and are not all versions of the present invention described, claimed and disclosed herein by inventors. Inventors have, however, set forth the best mode contemplated by inventors as being the best representation of the invention as shown and described.

The current invention uses a 'patch antenna overlay', which means each individual antenna has a 2×2 element cluster pattern. (FIG. 1) which constitutes a Patch Antenna Element (PAE) array. This 2×2 PAE can be scaled to any dimension so long as it conserves the minimum 2×2 element architecture i.e. one PAE with four elements, eight PAE with 32 elements.

RF power to the elements are multiplexed between elements via a Radio Frequency Multiplexor (RFMUX). The RFMUX 66 in conjunction with a single board computer has the ability to call out to any one element within any series of PAE's. Conversely, it can call out to two elements from two PAE or four elements within four different PAE's at a time. This series can be represented by PAE (P1-P8) and each element (A, B, C, or D) within that antenna. Because of this flexibility, the system can continuously and passively call out to any array of antenna elements, which allows for dynamic phase-shifting FIG. 4.

Dynamic Phase-Shifting affords the ability to create beamforming among the elements. Described succinctly in the detailed description of FIG. 5 the firing of four antenna elements in relative delay of each other affords the ability to shape the beam into various directions. Firing in this sense means producing a RF wave. This allows an RF wave to cross a plane in a non-perpendicular direction. As shown above, having a system that is dynamic, meaning having control over the RF wave propagation from one, two to four elements, where the present invention can account for the re-radiating cancelation that could destruct a signal. The RF field propagates, thus, in an X, Y and Z axis without the need for "directing" the field (e.g. RF fields) via reader/interrogator movement. The result is tag illumination of previously restricted tags that may be shadowed by other tags (or occluded by other tags) when a wave, as is customary in the art, is propagated in a single direction.

Without the 'beamforming' between two to four elements the propagation of the RF wave would be static and produced in an inefficient omnidirectional fashion. The omnidirectional output of RF waves would be equivalent to the RF waves produced in the hand-held wand, which forces the user to provide motion in order to detect/interrogate an RFID enabled item. Conversely, via dynamic wave phase shifting, which gives rise to beamforming, the present device supplies radio frequency waves systematically and selectively to overcome the above infirmities (e.g. tag detuning, re-radiation cancellation, and spillover and shadowing) to better detect, catalog and monitor surgical tool location and use.

The combination of dynamically forming arrays of individual elements and beamforming of signals affords the system the ability to direct the signal from the source (i.e. without the need for any manual movement of a device), obviating the need for supplying manual radio frequency wave manipulation or directional control thereof. Furthermore, the patch antenna overlay allows for the antenna/reader architecture and electronics to be encapsulated in a 3"-5" housing, which can be positioned on top of surfaces or retrofitted into a pre-existing space in the operating room.

The novelty and utility of this present antenna overlay system resides in the current system's ability to (1) produce a circular polarized field, (2) control wave propagation direction, (3) direct the efficient and effective generation and focused signaling of RF fields without signal spillover or bleed, (4) provide scalability into different dimensions to retrofit/replace pre-existing space in the operating room and (5) switch between antenna elements on a sub-second timeframe allowing the present invention to produce a continuous field that captures 99.9% of items, regardless of orientation, and item density (see generally FIG. 2 and FIG. 3) wherein instantaneous transfer of data can occur to a means of data collection (e.g. an external computer or wireless tablet) for sub-second data-gathering, data storage and data analysis.

As can be easily understood from the foregoing, the basic concepts of the present invention may be embodied in a variety of ways as involving structures, apparatuses, method steps, and techniques as well as devices to accomplish the appropriate inventive nature of the present invention(s).

In addition, while some devices and structures are disclosed, it should be understood that these not only accomplish certain methods but also can be varied in a number of ways. Importantly, as to all of the foregoing, all of these facets should be understood to be encompassed by this disclosure.

It should also be understood that a variety of changes may be made without departing from the scope of the invention. Such changes are implicitly included in the description and may be relied upon when drafting the claims for this or any subsequent patent application.

In conclusion, therefore, it is seen that the present invention and the embodiments disclosed herein and those covered by the appended claims are well adapted to carry out the objectives and obtain the ends set forth.

I claim:

1. An apparatus for detecting, monitoring and tracking of radiofrequency identification-tagged items comprising:
    an antenna/reader;
        said antenna reader capable of both transmitting and receiving electromagnetic RF waves;
        said antenna reader comprised of a 2×2 patch antenna element (PAE) array;
            said PAE comprised of 4 antenna elements;
            each said antenna element actuated sequentially via direction from an RFID Multiplexor (RFMUX);
            said RFMUX directed through signals encoded by programming from a Next Order of Computing (NUC);
            said 2×2 patch antenna element (PAE) array creating, through circular polarization and dynamic phase array shifting, directed RF wave beamforming via directed sequential antenna element excitation;
        said antenna reader creating sequential element actuations creating weighted signals, generated by directional signal processing and wave propagation, from said each element of said PAE via RF wave steering to selectively excite and interrogate integrated circuits in items having passive radio frequency (RF) tags in a two-dimensional or three-dimensional space.

* * * * *